United States Patent
Kuiper et al.

(10) Patent No.: US 12,240,673 B2
(45) Date of Patent: Mar. 4, 2025

(54) PACKAGING UNIT FROM A MOULDED PULP MATERIAL WITH PEELABLE LAMINATED LAYER AND METHOD FOR MANUFACTURING SUCH PACKAGING UNIT

(71) Applicant: Huhtamaki Molded Fiber Technology B.V., Leeuwarden (NL)

(72) Inventors: Harald John Kuiper, Heerenveen (NL); Jan Hendrik Timmerman, Brucht (NL)

(73) Assignee: Huhtamaki Molded Fiber Technology B.V., Leeuwarden (NL)

( * ) Notice: Subject to any disclaimer, the term of this patent is extended or adjusted under 35 U.S.C. 154(b) by 928 days.

(21) Appl. No.: 16/982,702

(22) PCT Filed: Mar. 13, 2019

(86) PCT No.: PCT/NL2019/050161
§ 371 (c)(1),
(2) Date: Sep. 21, 2020

(87) PCT Pub. No.: WO2019/190309
PCT Pub. Date: Oct. 3, 2019

(65) Prior Publication Data
US 2021/0009327 A1    Jan. 14, 2021

(30) Foreign Application Priority Data

Mar. 29, 2018   (NL) ...................................... 2020688
Jul. 17, 2018   (NL) ...................................... 2021327

(51) Int. Cl.
*B65D 1/34*       (2006.01)
*B32B 27/36*      (2006.01)
(Continued)

(52) U.S. Cl.
CPC ............ *B65D 65/466* (2013.01); *B32B 27/36* (2013.01); *B32B 2307/7163* (2013.01);
(Continued)

(58) Field of Classification Search
CPC .......... B65D 1/34; B65D 25/14; B65D 25/16; B65D 25/18; B65D 65/466; B65D 1/215;
(Continued)

(56) References Cited

U.S. PATENT DOCUMENTS 2,688,430 A * 9/1954 Lynmar ................ A47J 36/022
                                                    426/120
3,430,803 A * 3/1969 Nelson .................. A47G 23/06
                                                    D7/553.6
(Continued)

FOREIGN PATENT DOCUMENTS

EP      1905699     4/2008
GB      2449507     11/2008
(Continued)

*Primary Examiner* — Gideon R Weinerth
(74) *Attorney, Agent, or Firm* — Marcus C. Dawes

(57) ABSTRACT

The present invention relates to a packaging unit (2) for a moulded pulp material and a manufacturing process therefore. The packaging unit according to the invention comprises a product receiving or carrying compartment having a product contact surface, wherein the product contact surface comprises a peelable laminate layer (10). In a presently preferred embodiment the moulded pulp material comprises an amount of a bio-degradable aliphatic polyester.

11 Claims, 5 Drawing Sheets

(51) Int. Cl.
   *B65D 25/14*   (2006.01)
   *B65D 65/46*   (2006.01)
   *D21H 19/28*   (2006.01)
   *B65D 65/40*   (2006.01)

(52) U.S. Cl.
   CPC ............ *B32B 2439/70* (2013.01); *B65D 1/34* (2013.01); *B65D 65/40* (2013.01)

(58) Field of Classification Search
   CPC .................. B65D 1/0207; B32B 27/36; B32B 2307/7163; B32B 2439/70
   USPC ........................ 206/557; 428/34.2, 34.6, 35.6
   See application file for complete search history.

(56) References Cited

U.S. PATENT DOCUMENTS

| | | | | |
|---|---|---|---|---|
| 4,337,116 A * | 6/1982 | Foster | ..................... | B32B 27/10 428/36.1 |
| 5,206,087 A * | 4/1993 | Tokiwa | ................. | C08L 101/00 428/407 |
| 5,300,333 A * | 4/1994 | Wilkerson | ............... | A23L 7/126 426/106 |
| 5,376,320 A * | 12/1994 | Tiefenbacher | ........... | A21D 2/14 264/300 |
| 5,516,562 A * | 5/1996 | Edwards | .............. | B65D 65/466 428/76 |
| 5,545,450 A * | 8/1996 | Andersen | ............ | B29C 44/0407 428/152 |
| 5,786,408 A * | 7/1998 | Kuroda | ................... | C08L 75/06 525/437 |
| 5,827,905 A * | 10/1998 | Grigat | ..................... | C08L 75/06 523/124 |
| 5,964,933 A * | 10/1999 | Nakamura | ............... | C08L 97/02 106/217.7 |
| 5,968,616 A * | 10/1999 | Kakemura | ........... | B65D 1/0215 428/903.3 |
| 5,973,024 A * | 10/1999 | Imashiro | .............. | C08G 18/025 523/124 |
| 6,071,984 A * | 6/2000 | Grigat | ..................... | C08L 77/12 524/45 |
| 6,124,384 A * | 9/2000 | Shiraishi | ................. | C08L 67/06 524/72 |
| 6,437,022 B1 * | 8/2002 | Yoshihara | .............. | A45C 13/42 523/128 |
| 7,048,975 B1 * | 5/2006 | Tojo | .................... | B65D 1/0215 428/34.3 |
| 7,094,817 B2 * | 8/2006 | Halley | ..................... | C08L 3/00 524/386 |
| 8,172,106 B2 * | 5/2012 | Clamp | ..................... | B44D 3/126 220/570 |
| 8,557,945 B2 * | 10/2013 | Xu | ..................... | C08G 18/4225 528/289 |
| 8,691,893 B2 * | 4/2014 | Hashaikeh | ............... | C08J 3/005 524/35 |
| 8,701,905 B2 * | 4/2014 | Warner | ................ | B65D 1/0215 220/660 |
| 9,637,608 B2 * | 5/2017 | Rosen | ..................... | C08L 67/00 |
| 10,000,314 B2 * | 6/2018 | Slack | .................... | B65D 25/16 |
| 10,036,122 B2 * | 7/2018 | Alberts | ................. | C08L 1/02 |
| 10,315,058 B2 * | 6/2019 | Alberts | ................. | C08L 67/00 |
| RE48,027 E * | 6/2020 | Warner | ................ | B65D 39/088 |
| 2005/0202229 A1 * | 9/2005 | Ozasa | ..................... | B65D 65/466 428/318.4 |
| 2005/0236415 A1 * | 10/2005 | Ozasa | ................... | B32B 27/065 220/574 |
| 2009/0008819 A1 * | 1/2009 | Ozasa | ..................... | B29C 44/12 264/241 |
| 2009/0012210 A1 * | 1/2009 | Speer | ..................... | A23L 29/212 523/124 |
| 2009/0123767 A1 * | 5/2009 | Gohil | ..................... | B32B 27/285 428/458 |
| 2010/0044267 A1 * | 2/2010 | Tolibas-Spurlock ... | | B65D 1/095 156/245 |
| 2010/0084361 A1 * | 4/2010 | Dayton | ..................... | B31C 9/00 493/93 |
| 2010/0200596 A1 * | 8/2010 | Wallace | .................. | B65D 1/34 220/570 |
| 2010/0237069 A1 * | 9/2010 | Helou, Jr. | .............. | B65D 25/14 428/34.1 |
| 2010/0330312 A1 * | 12/2010 | Stockhaus | ............... | B29C 43/36 425/84 |
| 2011/0036846 A1 * | 2/2011 | Corbett | ..................... | B65D 1/22 220/495.03 |
| 2011/0139660 A1 * | 6/2011 | Cabell | ................. | B65D 21/048 156/212 |
| 2011/0174676 A1 * | 7/2011 | Stockhaus | ................ | B32B 7/06 427/317 |
| 2011/0178196 A1 * | 7/2011 | Steinke | ................... | C08L 69/00 523/447 |
| 2011/0259784 A1 * | 10/2011 | Tye | ........................ | B29C 51/10 156/287 |
| 2012/0165170 A1 * | 6/2012 | Wischusen, III | ....... | B31B 50/74 493/100 |
| 2015/0284133 A1 * | 10/2015 | Nevalainen | ............ | B65D 5/563 206/557 |
| 2018/0022529 A1 * | 1/2018 | Tye | ........................ | B65D 7/26 206/557 |
| 2019/0225411 A1 * | 7/2019 | Gerbaulet | ................ | B32B 7/12 |
| 2020/0114625 A1 * | 4/2020 | Van Trump | ............ | A47G 19/22 |
| 2020/0122874 A1 * | 4/2020 | Doster | ................ | B65D 65/466 |
| 2020/0131710 A1 * | 4/2020 | Kuiper | ..................... | B65D 85/30 |
| 2020/0181849 A1 * | 6/2020 | Esgueva Gutierrez .. | | B65D 1/34 |
| 2020/0216244 A1 * | 7/2020 | Pluquet | ............ | B29C 45/14811 |
| 2021/0114789 A1 * | 4/2021 | Kuiper | ..................... | B29C 70/88 |
| 2021/0164171 A1 * | 6/2021 | Kuiper | ................. | B65D 65/466 |
| 2021/0261310 A1 * | 8/2021 | Kuiper | ..................... | B29C 48/022 |
| 2022/0048673 A1 * | 2/2022 | Cruz | ........................ | B65D 1/34 |
| 2022/0072761 A1 * | 3/2022 | Versluys | ................ | B29C 51/04 |
| 2022/0185559 A1 * | 6/2022 | Pascal Fritz-Vietta | ...................... | B65D 1/34 |
| 2022/0314515 A1 * | 10/2022 | Anghileri | ................ | B29B 7/726 |
| 2023/0031748 A1 * | 2/2023 | Kuiper | ..................... | D21J 7/00 |
| 2023/0040636 A1 * | 2/2023 | Kuiper | ..................... | B32B 27/08 |
| 2023/0159241 A1 * | 5/2023 | Laurin | ..................... | B32B 37/12 206/524.2 |
| 2023/0159251 A1 * | 5/2023 | Perna | ..................... | B32B 27/08 220/359.2 |
| 2023/0166895 A1 * | 6/2023 | Kuiper | ..................... | B32B 3/266 428/35.7 |
| 2024/0336419 A1 * | 10/2024 | Kuiper | ..................... | B32B 27/306 |

FOREIGN PATENT DOCUMENTS

| | | |
|---|---|---|
| GB | 2477733 | 8/2011 |
| JP | H0823870 | 1/1996 |
| WO | 2010085504 | 7/2010 |
| WO | 2014161653 | 10/2014 |
| WO | 2016130006 | 8/2016 |

* cited by examiner

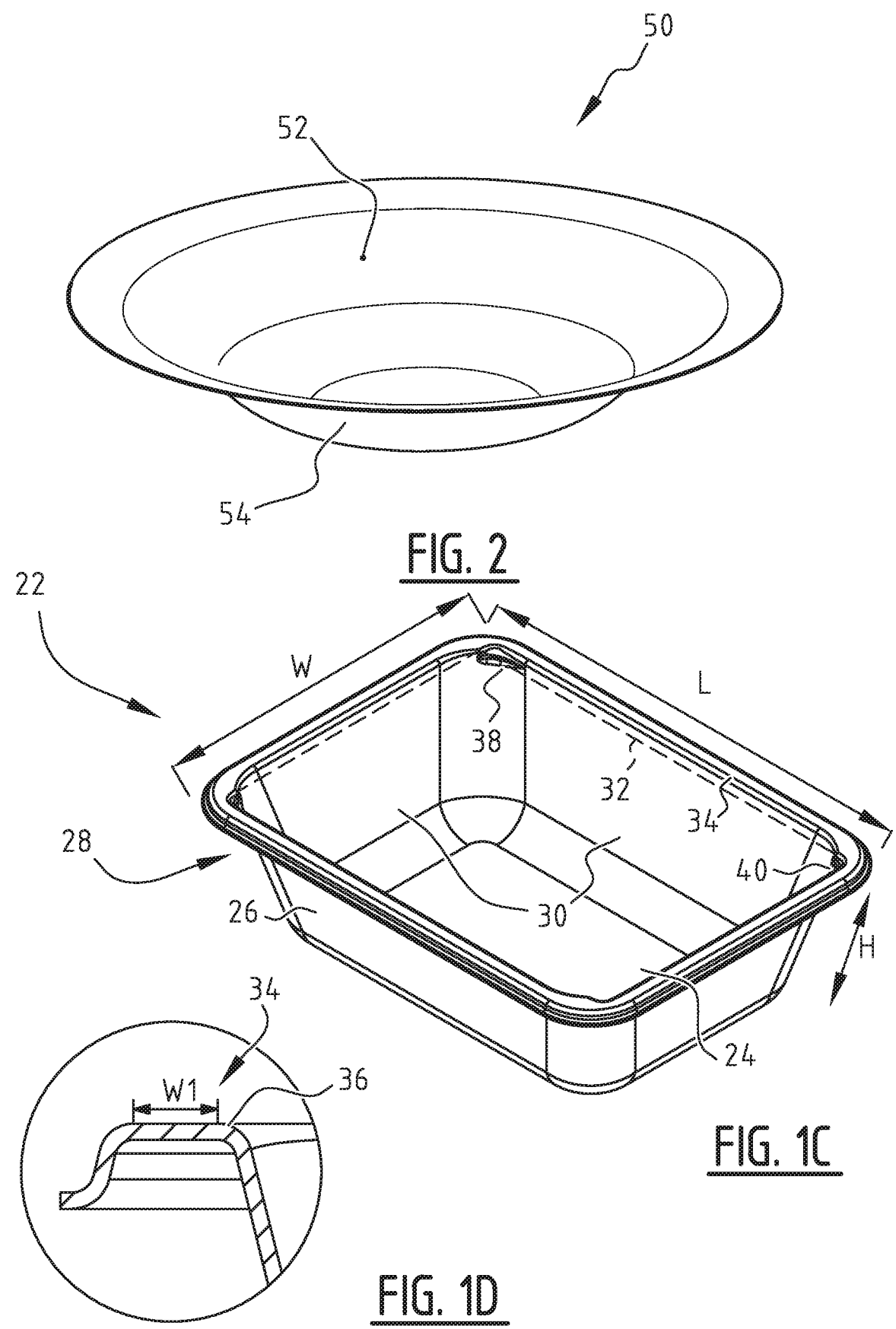

PACKAGING UNIT FROM A MOULDED PULP MATERIAL WITH PEELABLE LAMINATED LAYER AND METHOD FOR MANUFACTURING SUCH PACKAGING UNIT

The present invention relates to a packaging unit from a moulded pulp material. Such packaging units may relate to cases, boxes, cups, plates, carriers, sip lids, and other product packaging units.

Packaging units from a moulded pulp material use pulp from recycled paper material and/or virgin (wood) fibres.

A problem with conventional packaging units is often the recycling. This is especially the case for packaging units that come into contact with food products and often require an additional film layer on or in the packaging unit with a film layer acting as a barrier layer. This barrier separates the food product from the moulded pulp material of the packaging unit.

After the packaging unit became useless it is often treated as waste. Recycling is also not possible, due to the different composition of materials. In this manner such packaging units are not sustainable or at least not fully sustainable.

The present invention has for its object to obviate or at least reduce the above stated problems in conventional packaging units and to provide a packaging unit that is more sustainable and/or has improved recycling possibilities.

For this purpose, the present invention provides a packaging unit a product receiving or carrying compartment having a product contact surface, wherein the product contact surface comprises a peelable laminate layer.

The packaging unit comprises a product receiving or carrying compartment, more specifically the packaging unit relates to a food packaging unit. When in use, this compartment is in contact with the product, such as food products. The food receiving compartment may relate to a compartment configured for holding a food product, such as fruits, vegetables, meals etc., or a compartment configured for carrying products such as a plate, cup, bowl, bottle with water etc.

According to the present invention the product contact surface comprises a peelable laminate layer acting as a grease barrier film. This laminate layer can be removed from the packaging unit after the packaging unit served its purpose. This makes it possible to treat the moulded pulp material of the packaging unit separately from the peelable laminate layer. For example, the peelable laminate layer can be treated as waste material and the moulded pulp material can be recycled and can even be used to manufacture new packaging units. This provides a packaging unit that is more sustainable as compared to conventional packaging units. It will be understood that the laminate layer may also be recycled separately depending on the specific material from which it is made. As an even further advantage, the packaging unit with the cellulose-based laminate layer contributes to the recycling and/or biodegradability and/or compostable properties of the packing unit as it obviates the need for the use of fluorochemicals. For example, in the production of (Chinet) disposable tableware the fluorine chemistry can be reduced or even omitted from the manufacturing process. A further advantage of the present invention is the improvement of barrier properties, in addition to the property improvements that were mentioned earlier. Barrier properties may include oxygen and/or grease barriers. Also, the penetration of oil originating from the food product, such as pasta or French fries, into the food packaging unit can be reduced. Also, water barrier properties can be improved to reduce the penetration of water into the packaging unit and thereby reducing ridging problems, for example.

A further effect that is achieved to the packaging unit according to the invention is the improved insulation with the peelable laminate layer. This renders the packaging unit less sensitive to heat when heating the unit in an oven or microwave, for example. This reduces the risk of a consumer being injured when removing the packaging unit from the oven. Therefore, the packaging unit of the invention is safer in use. Experimental results clearly showed a substantial temperature difference in the range of 10-15° C. between conventional CPET packaging units and the packaging units according to the present invention showing that the packaging unit according to the invention is cooler when being touched by a user. Food temperatures are similar in both packaging units during the entire time period. Furthermore, during the experiments it was observed that the CPET trays became "wobbly"/unstable after heating.

In addition, the wipeability that relates to cleaning possibilities particular for cleaning/wiping the outer surface or product contact surface of the packaging unit was improved. This improves the overall appearance of the packaging unit of the invention.

In one of the presently preferred embodiments the peelable laminate layer is made of polyethylene terephthalate, commonly abbreviated as PET. It will be understood that other suitable materials can also be used for the laminate layer, including alternative thermoplastic polymers of the polyester family, for example.

The peelable laminate layer is removably connected to the moulded pulp material. This connection can be done directly or indirectly using an adhesive material such as glue. It is also possible to fuse or melt the peelable laminate layer (preferably in parts) to achieve the desired connection. This connection is made such that the peelable laminate layer can be removed by a user from the moulded pulp material after the packaging unit served its use. This improves the recycling properties for the packaging unit of the invention as compared to conventional packaging units.

In a further preferred embodiment of the present invention, the moulded pulp material comprises an amount of a biodegradable aliphatic polyester.

By providing the pulp material with an amount of a biodegradable aliphatic polyester improves the properties of the packaging unit as a whole. This may involve the possibility to improve the decomposing of the packaging unit, including home decomposition. Such home-compostable packaging unit further improves the overall sustainability of the packaging unit according to the invention. As a further effect, this enables replacing the sustainable materials such as CPET, PP, PE, PS, aluminium in (food) packaging units.

In one of the presently preferred embodiments of the invention, the amount of biodegradable aliphatic polyester in the food packaging unit is in a range of 0.5-20 wt. %, more preferably in the range of 1-15 wt. %.

By applying an amount of biodegradable aliphatic polyester in one of the aforementioned ranges, the sustainability and packaging characteristics of the food packaging unit according to the present invention is significantly improved.

In a further preferred embodiment of the invention the amount of biodegradable aliphatic polyester is in the range of 2-10 wt. %, preferably in the range of 5-9 wt. %, and most preferably in the range of 6.5-8 wt. %.

Applying an amount of biodegradable aliphatic polyester in these ranges provides packaging units that are both stable and strong. Preferably, the material is sufficiently refined to further enhance the desired characteristics. Especially, applying a refining energy of about 150 kWh/ton material showed a good effect in the mentioned range(s) of biodegradable aliphatic polyester. As a further effect, an overall weight reduction of the packaging unit can be achieved of up to about 20% without affecting the strength and stability of the packaging unit as compared to conventional products, such as CPET or PP trays or the like.

For example, the biodegradable aliphatic polyester may comprise an amount of one or more of PBS, PHB, PHA, PCL, PLA, PGA, PHBH and. PHBV. Preferably, the use of biodegradable aliphatic polyester is combined with the use of further additives or substances that aim at improving or achieving specific properties of the packaging unit. In further presently preferred embodiments the bio-polymers that are applied originate from so-called non-gmo (non-genetically modified organisms) biopolymers.

For example, it was shown that the use of PLA in addition to another biodegradable aliphatic polyester may improve the strength and stability of the packaging unit, thereby providing a stronger packaging unit and/or requiring less raw material.

According to one of the preferred embodiments of the invention the biodegradable aliphatic polyester comprises an amount of polybutylene succinate (PBS). PBS is one of the biodegradable aliphatic polyesters. PBS can also be referred to as polytetramethylene succinate. PBS decomposes naturally into water, $CO_2$ and biomass. The use of PBS as a compostable material contributes to providing a sustainable product.

The use of PBS is possible in food-contact applications including food packaging units from a moulded pulp material. An advantage of the use of PBS is that the decomposition rate of PBS is much higher as compared to other agents or components such as PLA (including variations thereof such as PLLA, PDLA and PLDLLA, for example).

Therefore, the use of PBS in a food packaging unit from moulded pulp significantly improves the sustainability of the packaging unit. This improves recycling possibilities and biodegrading or decomposing the packaging unit. For example, the use of PBS in lid seals may obviate the need for non compostable PE as inner liner.

Preferably, in one of the embodiments of the invention the packaging unit comprises an amount of micro fibrillated cellulose (MFC) sometimes also referred to as nanofibrillar cellulose or cellulose nanofibers. MFC preferably originates from cellulose raw material of plant origin. The use of MFC enhances the fiber-fiber bond strength and further improves the reinforcement effect. Although MFC is preferably applied in combination with one or more of the biodegradable aliphatic polyesters, it is also possible to use MFC as an alternative to these components.

In a further preferred embodiment of the invention the packaging unit comprises a layer of a biodegradable aliphatic polyester on a product contact surface to improve the connection of the peelable laminate layer to the packaging unit.

Experiments show that providing the biodegradable aliphatic polyester as a separate layer, as an alternative or in addition to blending it with the moulded pulp material, enable using or melting the biodegradable aliphatic polyester with the peelable laminate layer that may comprise PET. This has the advantage that the peelable laminate layer can be connected to the packaging unit relatively easily by providing a heat treatment, for example. Furthermore, this has the advantage that the biodegradable aliphatic polyester functions as a type of adhesive that can be recycled together with the moulded pulp material after having removed the peelable laminate layer. This further improves the recycling properties of the packaging unit of the invention as it obviates the use for other less sustainable adhesive components such as glue.

It was shown that in embodiments of the invention the biodegradable aliphatic polyester enhances the adhesive or gluing properties of the moulded pulp material to the peelable laminate layer. In some of the presently preferred embodiments, during manufacturing of the packaging unit, a thin layer of biodegradable aliphatic polyester is provided on the surface of the moulded pulp material to glue the peelable laminate layer effectively to the moulded pulp material. The thickness of this thin layer is preferably in the range of 1 to 100 μm.

In a further preferred embodiment of the invention the packaging unit is provided with a circumferential edge comprising a connecting surface that is substantially free of the peelable laminate layer.

In some embodiments packaging units are provided with a (transparent) seal, foil, film, sheet or liner closing the opening of the packaging unit. In fact, this layer acts as a closure to the packaging unit. The use of a biodegradable aliphatic polyester such as PBS and/or PLA in packaging units contributes to the adherence of this closure to the packaging unit. In fact the biodegradable aliphatic polyester (partly) acts as an adhesive or glue.

It was shown that this contributes to the hot seal peelability, i.e. removing the transparent layer after the packaging unit is heated in a microwave for example, and/or to the cold seal peelability, i.e. removing the transparent layer when taking the packaging unit from the fridge and before heating for example. Optionally, a thin layer of biodegradable aliphatic polyester is provided to adhere the transparent layer to the edge of the packaging unit. Preferably, the transparent layer is also home compostable. In a presently preferred embodiment the transparent layer comprises an amount or mixture of PBS, PHBT and/or PLA. Optionally, a thin anti-fog layer is provided to improve the transparency of the layer. Also optionally, the transparent layer comprises an amount of PVOH to improve the performance in relation to the $O_2$-permeability. This can advantageously be applied to packaging units for meat and meat products, for example.

In one of the preferred embodiments of the invention the food packaging unit is biodegradable. More preferably, the unit is biodegradable at a temperature in the range of 5 to 60° C., preferably in the range of 5-40° C., more preferably in the range of 10-30° C., even more preferably in the range of 15-25° C., and most preferably at a temperature of about 20° C. This renders decomposing of the packaging unit easier. Furthermore, this enables so-called ambient or at home decomposing of the packaging unit according to the invention. For example, the packaging unit according to the invention may be industrial and/or home compostable according to EN 13432.

Tests with a packaging unit in an embodiment of the invention showed a home compostability wherein the packaging unit (without peelable laminate layer) decomposed within 24 weeks in accordance with the accepted practical standard.

Optionally, the biodegradable aliphatic polyester, such as PBS, can be manufactured from fossil resources. More preferably, the biodegradable aliphatic polyester, such as PBS, is bio based and made from plant resources, for example. Such bio based biodegradable aliphatic polyester, such as PBS, further improves the sustainability of the food packaging unit.

Optionally, the moulded pulp material can be coloured using additives, dyes (basic dyes, direct dyes, anionic and/or cationic charged dyes), pigments or other components that provide colour to the packaging unit. This enables providing the packaging unit with a colour representative for its (intended) contents. For example, Indian meals can be provided in a red coloured packaging unit and Italian food can be provided in a green coloured packaging unit. It will be understood that these examples can be extended to other exchanges of information with a consumer. In a presently preferred embodiment cationic colouring agents are used.

In addition, or as an alternative, spray coating can be applied to improve the water and/or fat repellance. Preferably, an emulsion is spraid on the packaging unit that builds a thin film layer in the processing of the packaging unit.

In a further embodiment of the present invention the packaging unit further comprises an amount of natural and/or alternative fibers.

Providing an amount of natural and/or alternative fibers provides a natural feel to the packaging unit and/or improves the overall strength and stability of the packaging unit. Such natural/alternative fibers may comprise fibers from different origin, specifically biomass fibers from plant origin. This biomass of plant origin may involve plants from the order of Poales including grass, sugar cane, bamboo and cereals including barley and rice. Other examples of biomass of plant origin are plants of the order Solanales including tomato plants of which the leaves and/or stems could be used, for example plants from the Order Arecales including palm oil plants of which leaves could be used, for example plants from the Order Maphighiales including flax, plants from the Order of Rosales including hemp and ramie, plants from the Order of Malvales including cotton, kenaf and jute. Alternatively, or in addition, biomass of plant origin involves so-called herbaceous plants including, besides grass type plants and some of the aforementioned plants, also jute, Musa including banana, Amarantha, hemp, cannabis etcetera. In addition or as an alternative, biomass material origination from peat and/or moss can be applied.

Preferably, the (lignocellulosic) biomass of plant origin comprises biomass originating from plants of the Family of Poaceae (to which is also referred to as Gramineae). This family includes grass type of plants including grass and barley, maize, rice, wheat, oats, rye, reed grass, bamboo, sugar cane (of which residue from the sugar processing can be used that is also referred to as bagasse), maize (corn), sorghum, rape seed, other cereals, etc. Especially the use of so-called nature grass provides good results when manufacturing packaging units such as egg packages. Such nature grass may originate from a natural landscape, for example. This family of plants has shown good manufacturing possibilities in combination with providing a sustainable product to the consumer.

Many food packaging units are provided with a cover or seal or film to cover the compartment with the food product(s). A further problem with conventional food packaging units relates to such top seal film that needs to be disposed separately from the other part(s) of the packaging unit. This requires attention when disposing the packaging unit and/or increases the risk of mixed waste streams.

According to a preferred embodiment of the invention the packaging unit may comprise a biodegradable top seal film. Providing such biodegradable top seal film provides a fully biodegradable and compostable packaging unit for food products. This enhances disposal possibilities for the material, thereby obviating the risk of mixed waste streams. Furthermore, it reduces the amount of residual waste. This significantly improves the sustainability of the food packaging industry. In embodiments of packaging units with a top seal film, this top seal film is preferably provided with a multi-layer construction and a total thickness in the range of 25-100 µm, more preferably in the range of 30-50 µm. Individual layers may comprise barrier layers, cover layers and/or intermediate (or tie) layers.

Preferably, the packaging unit is provided with a circumferential edge comprising a connecting surface for the top seal film that is substantially free of the laminated multi-layer.

Such edge or alternative connecting surface enables the adherence of the top seal film to the compartments of the packaging unit. In some embodiments packaging units are provided with a (transparent) seal, foil, film, sheet or liner closing the opening of the packaging unit. In fact, this layer acts as a closure to the packaging unit. The use of a biodegradable aliphatic polyester such as PBS and/or PLA in packaging units contributes to the adherence of this closure to the packaging unit. In fact the biodegradable aliphatic polyester (partly) acts as an adhesive or glue.

It was shown that this contributes to the hot seal peelability, i.e. removing the transparent layer after the packaging unit is heated in a microwave for example, and/or to the cold seal peelability, i.e. removing the transparent layer when taking the packaging unit from the fridge and before heating for example.

Optionally, a thin layer of biodegradable aliphatic polyester is provided to adhere the transparent layer to the edge of the packaging unit. Preferably, the transparent layer is also home compostable. In a presently preferred embodiment the transparent layer comprises an amount or mixture of PBS, PHBT and/or PLA. Optionally, a thin anti-fog layer is provided to improve the transparency of the layer. Also optionally, the transparent layer comprises an amount of PVOH to improve the performance in relation to the $O_2$-permeability. This can advantageously be applied to packaging units for meat and meat products, for example.

In a presently preferred embodiment of the invention the top seal film also comprises one or more biodegradable aliphatic polyesters. This may improve the adherence of the top seal film to the laminated multi-layer and/or to the moulded or fluff pulp material. Optionally, a separate adherence layer is provided.

The present invention further relates to a method for manufacturing a packaging unit from a moulded pulp material, with the method comprising the steps of:
  preparing moulded pulp material;
  moulding the packaging unit;
  providing a peelable laminate layer onto the packaging unit; and
  releasing the packaging unit from the mould.

Such method provides the same effects and advantages as described in relation to the packaging unit. In accordance with invention, the peelable laminate layer can be provided before or after releasing the packaging unit from the mould. In a presently preferred embodiment the peelable laminate layer is provided in an in-mould operation, preferably in combination with an in-mould drying operation.

In a further preferred embodiment the method comprises the additional step of subjecting the packaging unit to a heating step heating the packaging unit to a temperature about the melting temperature of the biodegradable aliphatic polyester to crosslink/interact with the cellulose fibers of the laminate layer to increase strength and improve barrier properties. Preferably, the heating step heats the temperature of the packaging unit to a heating temperature in the range of 145-195° C., preferably in the range of 165-190° C., and most preferably to a temperature of about 180° C.

By adding an amount of biodegradable aliphatic polyester to the moulded pulp material, a packaging unit can be manufactured from a blend comprising fibers and biodegradable aliphatic polyester, and/or a separate layer comprising biodegradable aliphatic polyester, can be achieved. Such separate or additional layer may improve the fusing or melting process.

The method according to the invention provides a food packaging unit that is more sustainable than conventional packaging units that are moulded for food products. Optionally, other bio-material can be used in combination with the main biodegradable aliphatic polyester, such as PBS, PLA or similar biodegradable components. Such combinations or alternatives may provide similar effects and advantages as described in relation to the packaging unit.

In a further preferred embodiment of the invention the method comprises the additional step of removing the peelable laminate layer from the packaging unit. This makes it possible to treat the peelable laminate layer separately from the moulded pulp material of the packaging unit. This improves the overall sustainability of the packaging unit.

Optionally, an amount of natural fibres can be added to the moulded pulp material.

In some of the presently preferred embodiments the method further comprises the step of providing a top seal film, preferably a biodegradable and/or compostable top seal film.

In one of the presently preferred embodiments, the method further comprises the step of performing (dry) sterilisation and pasteurisation on the (filled) packaging units. Especially, in combination with the ($O_2$)-barrier properties of the laminated multi-layer (and top seal film) the shelf-life of the food product is significantly improved. In addition, the $O_2$-barrier prevents or at least reduces oxidation processes in the food and thereby contributes to the maintenance of food taste.

Further advantages, features and details of the invention are elucidated on the basis of preferred embodiments thereof, wherein reference is made to the accompanying drawings, in which:

FIGS. 1C and 1D show an alternative packaging unit according to the present invention;

FIG. 2 shows a plate acting as product carrier in an embodiment of the present invention.

Figure 1A:
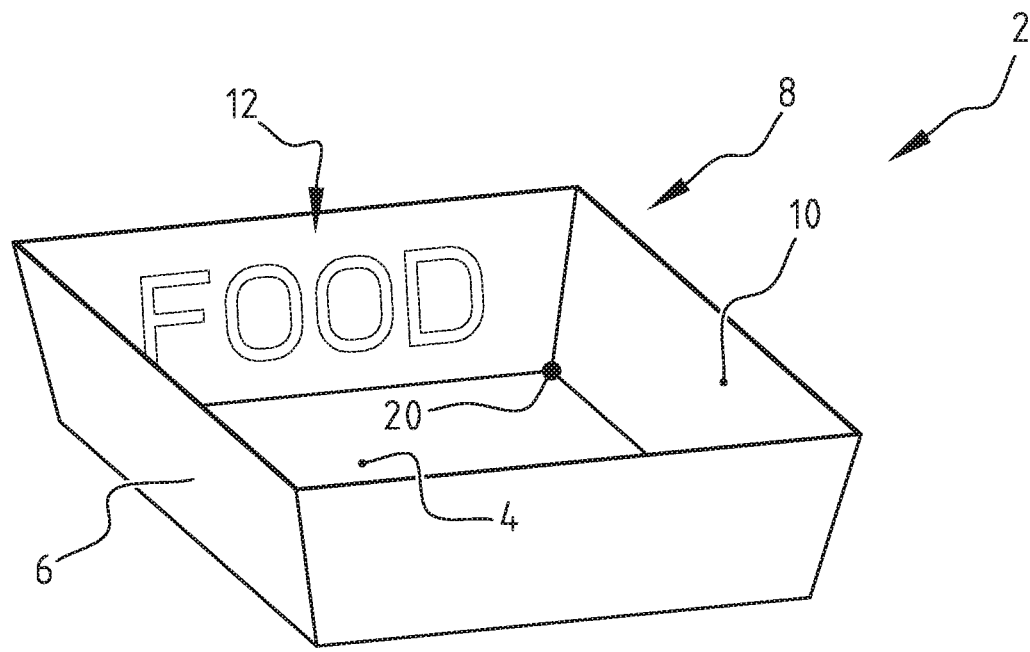
FIG. 1A shows a packaging unit according to the present invention.

Packaging unit 2 (FIG. 1A) comprises bottom part 4 and side walls 6. Side walls 6 define opening 8 that optionally can be closed by a lid. On the product surface side of container 2 peelable laminate layer 10 is provided. In the illustrated embodiment, peelable laminate layer 10 is connected with intermediate layer 11 to container 2.

In the illustrated embodiment peelable laminate layer 10 is made of PET. The material of packaging unit 2 is made of moulded fibre material that may originate from virgin (wood) fibres and/or recycled paper material. Preferably, in the illustrated embodiment container 2 is provided with an additional connection layer 11 that is at least partly comprising a biodegradable aliphatic polyester, in particular PLA or PBS. It will be understood that other alternative materials can also be envisaged in accordance to the present invention. Optionally, print 12 can be provided to peelable laminate layer 10.

Figure 1B:
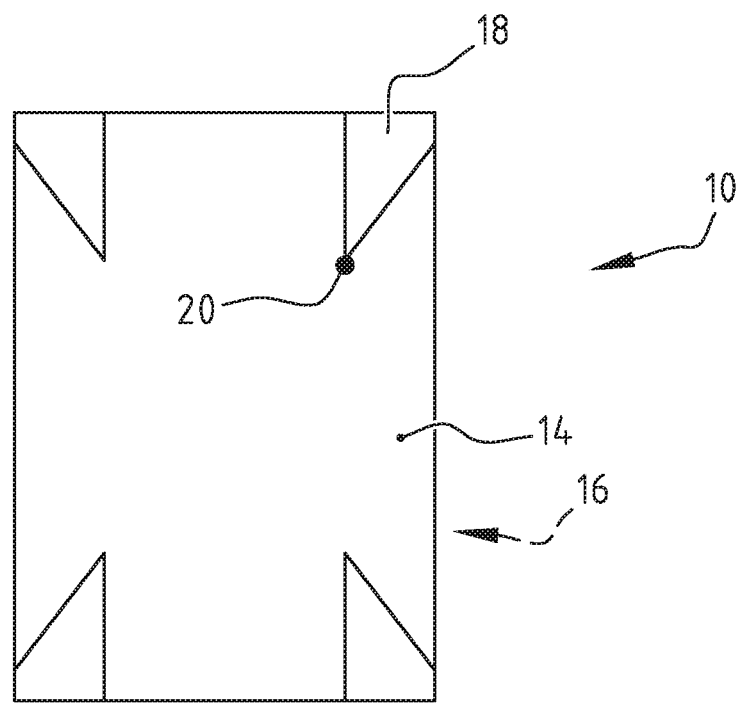
FIG. 1B shows an embodiment of a peelable laminate layer that can be connected to the moulded pulp material of the packaging unit.

Laminate layer 10 can be provided in different manners to packaging unit 2. In the illustrated embodiment, a sheet of laminate material (FIG. 1B) comprises a product side 14 and a back side 16. In accordance with the design and shape of container 2 parts 18 may be removed from the sheet of material to bring laminate layer 10 in accordance with the shape and design of packaging unit 2 including corners 20. It will be understood that other manufacturing methods can also be envisaged.

Packaging unit 2 can be configured to receive and hold different types of products, such as fruits, vegetables, meals and other non-food products.

Print 12 is preferably provided on the moulded pulp material side 16 of laminate layer 10 in a mirror view to render it visible for a consumer after the peelable laminate layer 10 is connected to packaging unit 2. This obviates the risk of printing ink coming into contact with the (food) product.

Packaging unit 22 (FIG. 1C) provides a further embodiment of a food receiving container having bottom part 24 and side walls 26 defining opening 28. Packaging unit 22 has length L, width W and height H. On the inside of container 22 there is provided peelable laminate layer 30, optionally comprising a print. In the illustrated embodiment peelable laminate layer 30 is provided on the inside of packaging unit 22 and extends from bottom part 24 up to contour or edge 32. Contour or edge 32 is provided a small distance from the upper side of edge 34. This distance is preferably in the range of 1 to 12 mm. Edge 34 (FIG. 1D) is provided with width W1 that defines contact surface 36 for connecting to a liner or seal. In the illustrated embodiment this liner or seal is connected directly to the moulded pulp material, optionally with an adhesive, in stead of being connected to laminate layer 30. Width W1 is in the illustrated embodiment in the range of 1 to 15 mm, preferably in the range of 2 to 5 mm.

Packaging unit 22 (FIG. 1C) comprises first denesting elements 38 and second denesting elements 40. In the illustrated embodiment denesting elements 38, 40 enable denesting of a stack of packaging units 22. Denesting elements 38, 40 are designed asymmetrically. It will be understood that alternative denesting elements can also be envisaged in accordance with the present invention as alternatives or in combination. These alternative denesting elements can be designed asymmetrically or symmetrically. Asymmetrical denesting elements enable denesting with packaging units 22 in one orientation and disable or at least render denesting more difficult in another orientation. Denesting elements 38, 40 have as an additional advantage that these elements do not significantly change the size of contact surface 36 and/or the internal volume of packaging unit 22. In the illustrated embodiment, denesting elements 38, 40 are provided at or adjacent edge 34. This prevents the provision of marks, edges, protrusions, nocks and the like on or close to bottom part 24. Such irregularities on or close to bottom part 24 hinders cleaning or emptying packaging unit 22.

It will be understood that other types of packaging units can also be envisaged in accordance with the present invention. For example, plate 50 (FIG. 2) can be provided with a peelable laminate layer 52 on the product contact side of plate 50, while backside or bottom 54 of plate 50 is not provided with this laminate layer 52. As shown in relation to packaging unit 2 a connecting layer 11 connects peelable laminate layer 52 to plate 50. In a presently preferred embodiment of the invention this adhesive layer 11 comprises a bio-degradable aliphatic polyester. Tests have shown that the combination of a mould fibre product with a peelable laminate layer provides a product that reduces the amount of waste and improves recycling possibilities. Tests with combination of the use of PLA and of peelable PET layer showed an improved wipeability of the packaging unit when compared to conventional packaging units. Furthermore, the peelable laminate PET layer can withstand high temperatures up to 250° C. This renders the packaging unit suitable for use in eating meals in an oven or microwave, for example. Although a bio-degradable aliphatic polyester can be used for connecting the peelable laminated layer to the packaging unit, as an alternative or an addition thereto, mechanical pressure can be provided to specially the edges of the laminate layer to connect it to the packaging units. In combination with the use of PLA the packaging units can be stored in a refrigerator or cold storage room while maintaining its mechanical stability and stiffness. Furthermore it was shown that there appears to be no fire risk as this packaging unit can be made ovenable relating to maintaining the packaging units for 30 minutes at a temperature of about 250° C. Furthermore, tests have shown that the use of a packaging unit with a peelable laminate layer may reduce the amount of plastic material with 80-90% and reducing the total weight with 10%. It will be understood that this specific amounts depend on the actual design of packaging unit 2.

Figure 3:
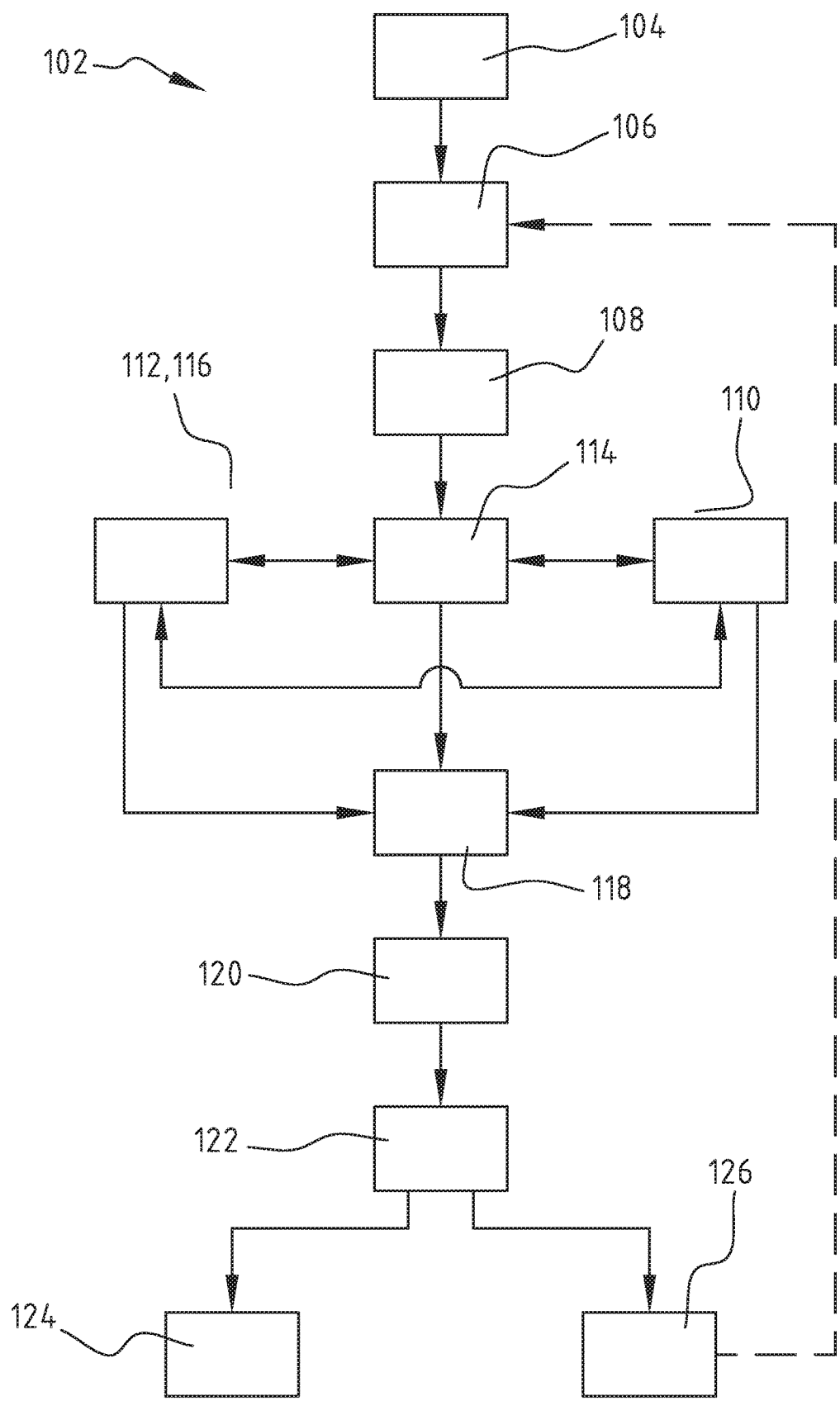
FIG. 3 shows the lifecycle process of the packaging unit according to the invention.

Life cycle process 102 (FIG. 3) for a packaging unit 2, 50 starts with design step 104. Pulp material is made in preparation step 106 after which moulding operation 108 can be performed. A laminate layer is provided in laminating step 110. In-moulded drying operation 112 is performed before releasing the product from the mould, while drying operation 116 is performed after the product is released from the mould in releasing step 114. Laminating step 110, wherein the peelable laminated layer is provided, can be performed before drying steps 112 or 116, and before or after releasing step 114. This renders it possible to combine different processing steps such as in-mould drying 112 or post-mould drying 116 in combination with in-mould providing laminate layer or post-mould providing laminate layer in laminating step 110. For example, the following combination of steps can be made: moulding 108, in-mould drying 112, laminating 110, releasing 114, and packing 118. Alternatively, moulding 108 can be followed by in-mould drying 112, releasing 114, laminating 110, and packing 118, or moulding 108 can be followed by releasing 114, laminating 110, drying 116, packing 118, or moulding 108 can be followed by any other suitable combination of steps. Packing 118 involves putting the products such as a food product into packing unit 2. After packing 118 the packaging unit is transported towards a consumer in use step 120, optionally involving storage. After use, the peelable laminate layer is peeled in peeling step 122 from package unit 2, 50. For example, the peelable laminated layer is treated as waste 124, while the moulded fibre material can be recycled in recycling step 126, and can optionally even be used in preparation step 106. It will be understood that other processes 102 in accordance with the present invention can also be envisaged.

It will be understood that other types of food packaging units can also be envisaged in accordance with the present invention.

Figure 4:
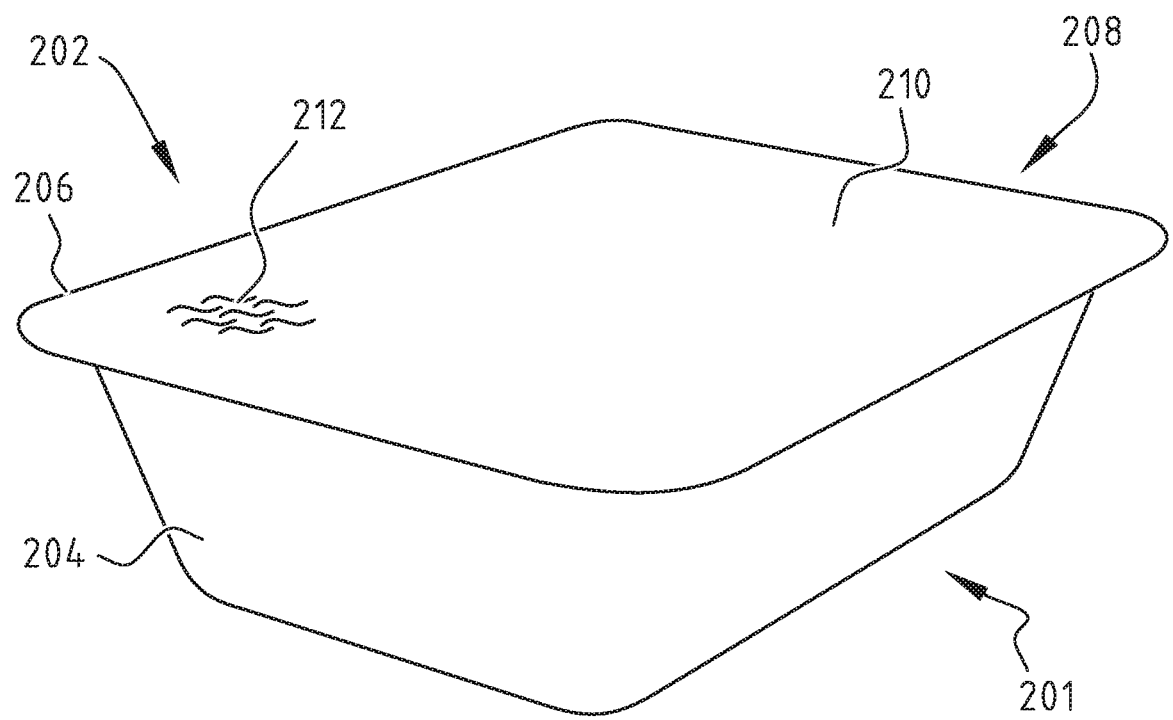
FIG. 4 shows an example of an alternative food packaging product according to the present invention.

Packaging unit 202 (FIG. 4) comprises laminated multi-layer or other film layer 201 that is provided on bottom part 204 and cover part 206. Unit 202 is provided with biodegradable aliphatic polyester, such as PBS and/or PLA, and is capable of holding an amount of ice cream. Cover part 206 comprises top seal 208 of a layer or film 210 of biodegradable aliphatic polyester(s), wherein optionally a (paper) label is provided. Optionally, fibers 212 are included in the cover part 206. This improves the possibilities for giving the unit a natural paper feel and/or look. This may also be applied to other type of packaging units. For example, in instant or ready-to-eat meals, such that conventional sleeves can be omitted from the packaging units. This enables a more cost-efficient packaging unit with a possible weight reduction.

Packaging unit 202 has numerous applications, including but not limited to, airplane meals. Such meals are provided to the airplane after (dry) sterilisation and pasteurisation. In combination with the ($O_2$)-barrier properties of the laminated multi-layer or other film layer (and top seal film) the shelf-life of the food product is significantly improved. In addition, the $O_2$-barrier prevents or at least reduces oxidation processes in the food and thereby contributes to the maintenance of food taste.

Figure 5A:
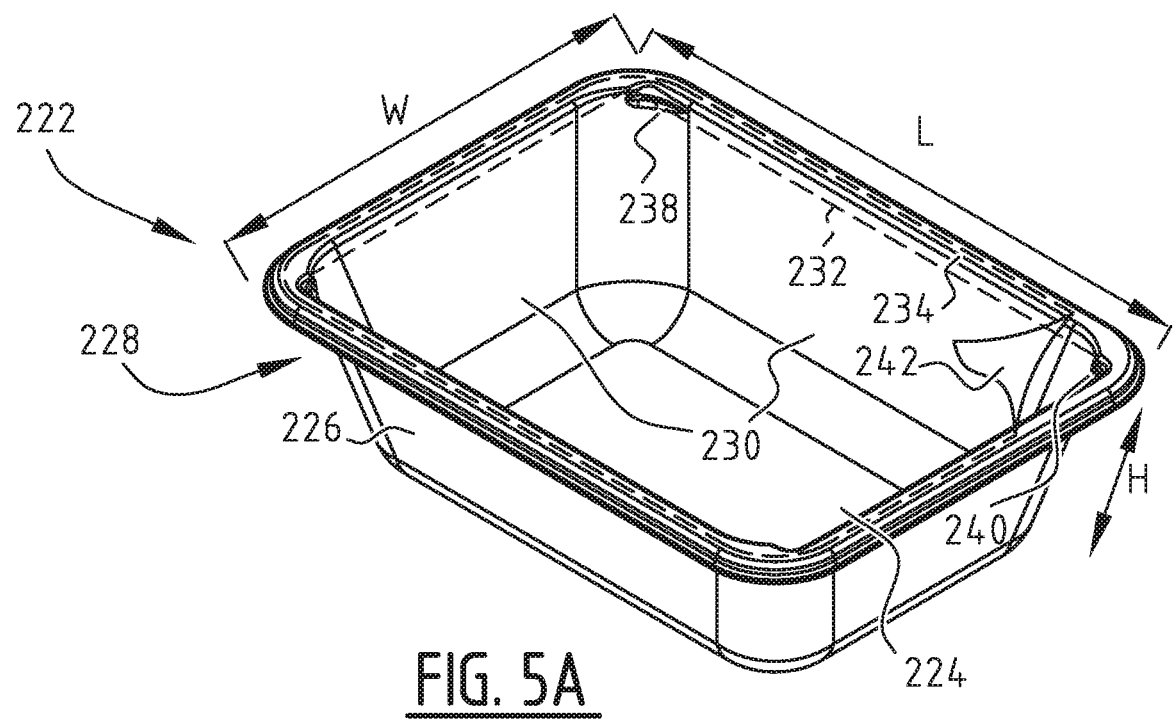
FIG. 5 A-B shows a further example of an alternative food packaging product according to the present invention.
Figure 5B:
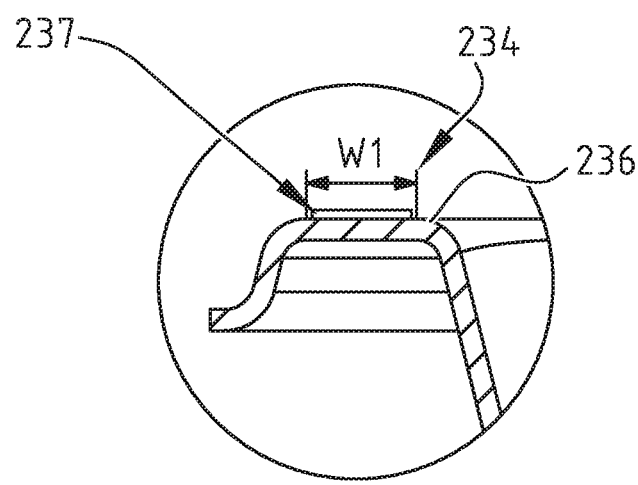

A further alternative packaging unit 222 (FIG. 5A) provides a further embodiment of a food receiving container having bottom part 224 and side walls 226 defining opening 228. Packaging unit 222 has length L, width W and height H. On the inside of packaging unit 222 there is provided laminated multi-layer or other film layer 230, optionally comprising a print. In the illustrated embodiment laminated multi-layer or other film layer 230 is provided on the inside of packaging unit 222 and extends from bottom part 224 up to contour or edge 232. Contour or edge 232 is provided a small distance from the upper side of edge 234 and is provided with a layer 237 of a biodegradable aliphatic polyester. This distance is preferably in the range of 1 to 12 mm. Edge 234 (FIG. 5B) is provided with width W1 that defines contact surface 236 for connecting to liner or seal 242 that is schematically illustrated. In the illustrated embodiment this liner or seal 242 is connected directly to the moulded pulp material, optionally with an adhesive, in stead of being connected to laminated multi-layer or other film layer 230. Such adhesive preferably comprises an amount of biodegradable polyester, for example PLA. Width W1 is in the illustrated embodiment in the range of 1 to 15 mm, preferably in the range of 2 to 5 mm.

Packaging unit 222 (FIG. 5A) comprises first denesting elements 238 and second denesting elements 240, similar to denesting elements 38, 40 in an earlier described embodiment.

The present invention is by no means limited to the above described preferred embodiments thereof. The rights sought are defined by the following claims, within the scale of which many modifications can be envisaged.

The invention claimed is:

1. Packaging unit from a moulded pulp material, the packaging unit comprising a product receiving or carrying compartment having a product contact surface,
   wherein the product contact surface comprises a peelable laminate layer,
   wherein the peelable laminate layer is removably connected to the moulded pulp material,
   wherein the moulded pulp material comprises an amount of a biodegradable aliphatic polyester blended into the moulded pulp material, wherein the amount of biodegradable aliphatic polyester in the moulded pulp material is in the range of 0.5-20 wt. %, and wherein the biodegradable aliphatic polyester is configured to removably couple the peelable laminate layer to the moulded pulp material.

2. Packaging unit according to claim 1, further comprising an amount of adhesive material configured to connect the peelable layer to the packaging unit.

3. Packaging unit according to claim 1, wherein the biodegradable aliphatic polyester comprises an amount of one or more of PBS, PHB, PHA, PCL, PLA, PGA, PHBH and PHBV, and wherein the biodegradable aliphatic polyester is bio-based.

4. Packaging unit according to claim 1, wherein the packaging unit comprises a layer of biodegradable aliphatic polyester on the product contact surface to improve connecting the peelable laminate layer to the packaging unit.

5. Packaging unit according to claim 1, wherein the packaging unit comprises a circumferential edge comprising a contact surface, wherein the circumferential edge is disposed a distance from the laminate layer.

6. Packaging unit according to claim 1, further comprising an amount of natural and/or alternative fibers.

7. Packaging unit according to claim 1, further comprising a biodegradable top seal film for covering the food receiving or carrying compartment.

8. Packaging unit according to claim 7, wherein the packaging unit comprises a circumferential edge comprising a contact surface for the top seal film.

9. Packaging unit according to claim 7, wherein the top seal film comprising a biodegradable aliphatic polyester.

10. Packaging unit from a moulded pulp material, the packaging unit comprising:
    a product receiving or carrying compartment having a product contact surface, wherein the product contact surface comprises a peelable laminate layer; and
    an amount of adhesive material configured to removably connect the peelable laminate layer to the packaging unit,
    wherein peelable laminate layer is removably connected to the moulded pulp material,
    wherein the moulded pulp material comprises an amount of a biodegradable aliphatic polyester blended into the moulded pulp material,
    wherein the unit is biodegradable at a temperature in the range of 5° to 60° C.,
    wherein the amount of biodegradable aliphatic polyester is in the range of 0.5-20 wt. %, and
    wherein the adhesive material configured to removably connect the peelable laminate layer to the packaging unit comprises a layer of biodegradable aliphatic polyester.

11. Packaging unit from a moulded pulp material, the packaging unit comprising a product receiving or carrying compartment having a product contact surface,
    wherein the product contact surface comprises a peelable laminate layer,
    wherein the peelable laminate layer is removably connected to the moulded pulp material,
    wherein the packaging unit comprises a layer of biodegradable aliphatic polyester on the product contact surface to improve connecting the peelable laminate layer to the moulded pulp material,
    wherein the moulded pulp material comprises an amount of the biodegradable aliphatic polyester blended into the moulded pulp material,
    wherein the amount of biodegradable aliphatic polyester in the moulded pulp material is in the range of 0.5-20 wt. %, and
    wherein the biodegradable aliphatic polyester is an adhesive configured to removably couple the peelable laminate layer to the moulded pulp material.

* * * * *